(12) United States Patent
Ikegami et al.

(10) Patent No.: US 9,776,352 B2
(45) Date of Patent: Oct. 3, 2017

(54) METHOD OF PRODUCING ANIMAL LITTER INCLUDING BENTONITE

(71) Applicant: UNICHARM CORPORATION, Ehime (JP)

(72) Inventors: Takeshi Ikegami, Kagawa (JP); Kenji Hiroshima, Kagawa (JP)

(73) Assignee: Unicharm Corporation, Ehime (JP)

( * ) Notice: Subject to any disclaimer, the term of this patent is extended or adjusted under 35 U.S.C. 154(b) by 254 days.

(21) Appl. No.: 14/585,368

(22) Filed: Dec. 30, 2014

(65) Prior Publication Data

US 2016/0185024 A1 Jun. 30, 2016

(51) Int. Cl.
*B29C 47/00* (2006.01)
*A01K 1/015* (2006.01)
*B29L 31/00* (2006.01)

(52) U.S. Cl.
CPC ........ *B29C 47/0011* (2013.01); *A01K 1/0152* (2013.01); *A01K 1/0154* (2013.01); *B29L 2031/00* (2013.01)

(58) Field of Classification Search
CPC .... A01K 1/0152; A01K 1/0154; A01K 1/015; A01K 15/00; A01K 29/00; B29C 47/0011; B29L 2031/00; B01J 2/20; B01J 2/30

See application file for complete search history.

(56) References Cited

U.S. PATENT DOCUMENTS

| 3,789,797 | A | * | 2/1974 | Brewer | A01K 1/0155 119/171 |
| 5,975,019 | A | * | 11/1999 | Goss | A01K 1/0154 119/173 |
| 7,895,976 | B2 | * | 3/2011 | Ikegami | A01K 1/0152 119/171 |
| 2005/0005870 | A1 | * | 1/2005 | Fritter | A01K 1/0152 119/173 |
| 2005/0132968 | A1 | * | 6/2005 | Swank | A01K 1/0152 119/171 |
| 2005/0160997 | A1 | * | 7/2005 | Weaver | A01K 1/0155 119/171 |
| 2010/0006035 | A1 | * | 1/2010 | Spittle | A01K 1/0152 119/172 |
| 2011/0185978 | A1 | * | 8/2011 | Dixon | A01K 1/0154 119/173 |
| 2013/0213309 | A1 | * | 8/2013 | Wang | A01K 1/0152 119/165 |

FOREIGN PATENT DOCUMENTS

| JP | H01-312945 | 12/1989 |
| JP | 2013-252082 A | 12/2013 |
| WO | WO 2013/183390 A1 | 12/2013 |

* cited by examiner

*Primary Examiner* — Joseph S Del Sole
*Assistant Examiner* — Cedrick Williams
(74) *Attorney, Agent, or Firm* — Brinks Gilson & Lione

(57) ABSTRACT

A method of producing animal litter including bentonite which includes a step of forming, from a starting material for animal litter containing bentonite, a starting mixture that contains 10 to 60 mass % of granules that remain on an 8.0 mm-aperture sieve and 40 to 90 mass % of granules that pass through an 8.0 mm-aperture sieve, a step of conveying the starting mixture on a path of conveyance, a step of loading the starting mixture that has been conveyed on the path of conveyance into a granulator capable of pulverizing and granulation, pulverizing at least the granules remaining on the 8.0 mm-aperture sieve while forming a granulated product, and a step of drying the granulated product.

20 Claims, No Drawings

METHOD OF PRODUCING ANIMAL LITTER INCLUDING BENTONITE

TECHNICAL FIELD

The present disclosure relates to a method of producing animal litter including bentonite.

BACKGROUND ART

Toilets for animals that are kept as pets, such as dogs and cats, are known to comprise a box-shaped toilet container and animal litter housed in the toilet container. Known animal litter includes sand, such as bentonite-based sand (see PTL 1 and PTL 2, for example).

Bentonite-based sand swells when it absorbs excreted urine, exhibiting cohesiveness and forming numerous lumps containing sand and urine. Pet owners can easily dispose of the urine by removing the lumps, allowing the animal toilet to be kept in a hygienic state.

Bentonite-based sand is generally produced by adding a sodium source, such as sodium carbonate and water to bentonite fine powder obtained by drying and pulverizing crude bentonite, and mixing these to form a mixture, conveying the mixture to a granulator by a belt conveyor, granulating the mixture with the granulator, and drying the granulated product.

CITATION LIST

Patent Literature

PTL 1 Japanese Unexamined Patent Publication No. 1-312945
PTL 2 Japanese Unexamined Patent Publication No. 2013-252082

SUMMARY OF INVENTION

Technical Problem

However, due to its nature, bentonite fine powder tends to accumulate in the corners of the path of conveyance, and granules containing bentonite having a high moisture content is tacky and tends to adhere to the path of conveyance when it is conveyed. As a result, bentonite fine powder and granules accumulate in the path of conveyance as time progresses, causing blockage of the path of conveyance and potentially halting the manufacturing line, or the manufacturing line must be periodically stopped to clean the path of conveyance.

It is therefore an object of the present disclosure to provide a method of producing animal litter including bentonite that minimizes blocking of the path of conveyance by bentonite during production.

Solution to Problem

The present inventors have found a method of producing animal litter including bentonite, the method comprising a step of forming, from a starting material for animal litter containing bentonite, a starting mixture that contains 10 to 60 mass % of granules that remain on a 8.0 mm-aperture sieve and 40 to 90 mass % of granules that pass through a 8.0 mm-aperture sieve, a step of conveying the starting mixture on a path of conveyance, a step of loading the starting mixture that has been conveyed on the path of conveyance into a granulator capable of pulverizing and granulation, to pulverize the granules remaining on at least the 8.0 mm-aperture sieve while forming a granulated product, and a step of drying the granulated product.

Advantageous Effects of Invention

The production method of this disclosure produces bentonite having excellent productivity that does not block the path of conveyance.

DESCRIPTION OF EMBODIMENTS

[Definitions]

Several terms will be now be defined, before explaining the method of producing animal litter according to the present disclosure.

"Particle Diameter"

For the purpose of this disclosure, the particle diameters and amounts of granules and pulverized crude bentonite were measured by sieve screening.

The sieve screening was carried out in the following manner.

(i) A metal net sieve with a prescribed aperture is prepared. The metal net sieve may have an inner diameter of 200 mm, a depth of 45 mm and an aperture of 8.0 mm, 10.0 mm or the like.

(ii) A vibrating sifter (Model AS-200, product of Retsch) is prepared.

(iii) The metal net sieve is set in the vibrating sifter, 100 g of sample is filled into the metal net sieve, and the sample is sifted for 30 seconds at a setting of 60.

(iv) The mass of the sample remaining on the metal net sieve, the mass of the sample passing through the metal net sieve, and their ratio, are measured.

"Core Section" and "Shell Section"

For the purpose of this disclosure, the core section and shell section of the granules remaining on the 8.0 mm-aperture sieve are the sections located at the center side and outer side, respectively, of the granules, and they are separated by the sieve screening.

Specifically, when the granules are subjected to sieve screening by the following method, the core sections are those remaining on the sieve and the shell sections are those passing through the sieve.

The sieve screening was carried out in the following manner.

(i) A metal net sieve with an inner diameter of 200 mm, a depth of 45 mm and an aperture of 1 mm is prepared.

(ii) A vibrating sifter (Model AS-200, product of Retsch) is prepared.

(iii) The metal net sieve is set in the vibrating sifter, 100 g of sample is filled onto the metal net sieve, the sample is sifted with a setting of 60, and the mass of the sample remaining on the metal net sieve, the mass of the sample passing through the metal net sieve, and their ratio, are periodically monitored.

(iv) The sieve screening is completed when the mass of the sample passing through the metal net sieve reaches 2 mass % of the original mass of the sample, and the sample remaining on the metal net sieve is used as the core section while the sample passing through the metal net sieve is used as the shell section.

The moisture contents of the core section and the shell section are measured by the following method.

"Moisture Content"

For the purpose of this disclosure, the moisture content of the sample, such as of the granules, core section and shell section, is measured in the following manner. The mass: $m_1$ (g) of the sample before drying is measured, the undried sample is dried at 110° C. for 240 minutes, and the mass: $m_2$ (g) of the dried sample is measured.

The moisture content (mass %) is calculated by the following formula:

$$\text{Moisture content (mass \%)} = 100 \times (m_1 - m_2)/m_1$$

When the sample has a section with a thickness of greater than 10 mm, the sample is first cut into a fragment with a thickness of no greater than 10 mm, and then the moisture content is measured.

The method of producing animal litter including bentonite according to the present disclosure will now be described in detail.

The method of producing animal litter according to the disclosure comprises the following steps.

(1) A step of forming a starting mixture containing 10 to 60 mass % of granules that have remained on a 8.0 mm-aperture sieve and 40 to 90 mass % of granules that have passed through a 8.0 mm-aperture sieve, from the starting material for the animal litter containing bentonite (hereunder also referred to as "step (1)".

(2) A step of conveying the starting mixture on a path of conveyance (hereunder also referred to as "step (2)").

(3) A step of loading the starting mixture that has been conveyed on the path of conveyance into a granulator capable of performing pulverizing and granulation, to pulverize the granules that have remained on at least an 8.0 mm-aperture sieve, while forming a granulated product (hereunder also referred to as "step (3)").

(4) A step of drying the granulated product (hereunder also referred to as "step (4)").

[Step (1)]

In step (1), a starting mixture containing 10 to 60 mass % of granules that have remained on an 8.0 mm-aperture sieve and 40 to 90 mass % of granules that have passed through an 8.0 mm-aperture sieve, is formed from the starting material for the animal litter containing bentonite.

Throughout the present specification, the granules that have remained on the 8.0 mm-aperture sieve may be referred to as "first granules", and the granules that have passed through the 8.0 mm-aperture sieve may be referred to as "second granules".

The starting materials for the animal litter containing bentonite may be, for example, bentonite, a sodium-containing compound, water, additives and the like.

Examples of bentonite include pulverized crude bentonite, and fine powder of bentonite produced by drying and pulverizing crude bentonite (hereunder also referred to simply as "bentonite fine powder").

There are no particular restrictions on pulverized crude bentonite, and it may be obtained by pulverizing and rounding crude bentonite with a roller mill.

The pulverized product contains the granules that have remained on a 1.0 mm-aperture sieve and passed through a 10.0 mm-aperture sieve, in a proportion of preferably 1 to 70 mass % and more preferably 5 to 50 mass %. This is from the viewpoint of the particle diameter of the first granules that are formed.

Such pulverized products are commercially available.

The bentonite fine powder has a particle diameter of preferably 0.001 to 1 mm and more preferably 0.01 to 0.4 mm. If the particle diameter is smaller than 0.001 mm the bentonite fine powder will tend to fly up, creating a problem from the viewpoint of the working environment, and if the particle diameter is larger than 1 mm the first granules will tend to not have core sections and shell sections with the prescribed moisture content.

The fine powder has a moisture content of preferably 3 to 14 mass % and more preferably 5 to 12 mass %. If the moisture content is higher than 14 mass %, the first granules will tend to not have core sections and shell sections with the prescribed moisture content.

Such fine powder is commercially available, for example, under the trade name "Tsugaru #2" by Nihon Kouken Co., Ltd.

The sodium-containing compound is an optional component that may be added to convert the montmorillonite as the main component of bentonite, from a Ca-type to a Na-type, which has an excellent swelling property and thickening property. The sodium-containing compound is not particularly restricted so long as it releases sodium ions, and examples include sodium carbonate and sodium hydroxide, which may be added as water-soluble solutions.

The starting material for the animal litter containing bentonite may contain the sodium-containing compound in a proportion of, for example, 0.1 to 3.0 mass % with respect to the total amount of bentonite.

The additive may be one that is added to animal litter in the technical field, and for example, it may be an aromatic, a pigment, an antioxidant, an antimicrobial agent, such as a copper compound, silver compound, polyphenol or hydroxybenzoic acid, a microbicide, such as triclosan, isopropylmethylphenol, benzalkonium chloride or isothiazolone, an antiseptic agent, a mildew resistant agent or any of various plant extracts.

The starting material for the animal litter containing bentonite may be mixed using any apparatus without restrictions so long as it can form the prescribed starting mixture, and it may be mixed using a mixer known in technical field. An example of a mixer is an Eirich mixer.

The starting mixture contains 10 to 60 mass % of the first granules and 40 to 90 mass % of the second granules, preferably it contains 13 to 55 mass % of the first granules and 45 to 87 mass % of the second granules, and even more preferably it contains 15 to 50 mass % of the first granules and 50 to 85 mass % of the second granules.

If the proportion of first granules is less than 10 mass %, the starting mixture will tend to accumulate in the path of conveyance when conveyed, tending to block the path of conveyance. Also, if the proportion of first granules is greater than 60 mass %, it may be difficult to form a homogeneous granulated product, tending to result in inferior moldability. For example, a granulated product composed entirely of pulverized crude bentonite may be formed.

When the starting material for the animal litter containing bentonite contains pulverized crude bentonite, the first granules preferably include the pulverized crude bentonite or a portion thereof. This will increase the hardness of the first granules, helping to reduce disintegration of the first granules when the starting mixture is conveyed through the path of conveyance.

When the starting material for the animal litter containing bentonite contains bentonite fine powder, the first granules preferably contain the crude bentonite fine powder at least near the surface of the first granules. This is because the moisture content at the surface of the first granules will be reduced, helping to prevent the surface of the first granules from exhibiting tack, and minimizing accumulation of the first granules in the path of conveyance.

When the starting material for the animal litter containing bentonite contains pulverized crude bentonite and bentonite fine powder, the first granules preferably contain the pulverized crude bentonite or a portion thereof and the bentonite fine powder, and the core section contains the pulverized crude bentonite at preferably 50 mass % or greater, more preferably 60 mass % or greater and even more preferably 70 mass % or greater, while the shell section contains the bentonite fine powder at preferably 50 mass % or greater, more preferably 60 mass % or greater and even more preferably 70 mass % or greater. This is because the hardness of the first granules will increase and the surfaces of the first granules will tend to not have tack.

The second granules may contain pulverized crude bentonite and bentonite fine powder, or a mixture thereof with water.

[Step (2)]

In step (2), the starting mixture is conveyed on a path of conveyance. The path of conveyance is not particularly restricted, and for example, it may be a chute or conveyor, such as a belt conveyor, and in consideration of the tendency of the path of conveyance to become blocked, the effect of the present disclosure will be higher when the path of conveyance is a chute.

In the method of the present disclosure, the path of conveyance has a downward gradient of preferably 100% or greater and more preferably 300% or greater. If the downward gradient is less than 100%, the first granules will be less able to roll down the path of conveyance, and it will become difficult to remove accumulated matter of the starting mixture from the path of conveyance. There is no particular restriction on the upper limit for the downward gradient, but if the downward gradient is greater than 500%, the starting mixture will already tend to be less likely to block the path of conveyance.

A downward gradient of 1% for the path of conveyance means that the path of conveyance lowers by 1 m in the vertical direction every 100 m in the horizontal direction, and a downward gradient of 1% or greater for the path of conveyance means that the path of conveyance lowers by at least 1 m in the vertical direction every 100 m in the horizontal direction.

[Step (3)]

In step (3), the starting mixture that has been conveyed on the path of conveyance is loaded into a granulator capable of performing pulverizing and granulation, to pulverize at least the first granules, while forming a granulated product.

The granulator used may be a granulator known in the technical field, without any particular restrictions so long as it can pulverize and granulate the starting mixture.

For example, the granulator may be the extruding granulator described in Japanese Unexamined Patent Publication SHO No. 59-59240, or a semi-dry/low-moisture granulator, or as a commercial product, it may be a disc pelleter made by Dalton Co., for example.

[Step (4)]

In step (4), the granulated product is dried. The dryer used for drying may be one commonly used in the technical field, and a rotary kiln may be mentioned as an example.

In step (4), the granulated product is dried at a temperature of 100 to 800° C., for example, to a moisture content of 0 to 10 mass %, for example.

EXAMPLES

The present disclosure will now be explained in fuller detail by examples, with the understanding that it is not meant to be limited to the examples.

Example 1

An Eirich mixer and a wet extruding granulator (trade name: F-5 by Dalton Co., Ltd., screen thickness: 3 mm, pore diameter: 2.5 mm) were connected via a stainless steel path of conveyance with an U-shaped cross-section (length: 1 m, downward gradient: 100%), to prepare a continuous production apparatus for animal litter.

The following components were packed into the Eirich mixer in a proportion of 10 parts of pulverized crude bentonite (from Kuroishi City, Aomori Prefecture, granules remaining on 1.0 mm-aperture sieve and passing through 10.0 mm-aperture sieve: 40 mass %), 90 parts of bentonite fine powder (product of Nihon Kouken Co., Ltd., trade name: Tsugaru #2), 1 part of sodium carbonate and 10 parts of water, and these were mixed to produce starting mixture No. 1.

The proportions of first granules and second granules of starting mixture No. 1 were 10 mass % and 90 mass %, respectively. Also, the moisture content of the first granules was 27 mass %, and the moisture content of the core section was higher than the moisture content of the shell section.

Starting mixture No. 1 was passed through the path of conveyance and loaded into the wet extruding granulator, and a total of 10 kg of undried granulated product No. 1 was produced from the starting mixture No. 1.

After producing a total of 10 kg of undried granulated product No. 1, the degree of accumulation of the starting mixture in the path of conveyance was evaluated on the following scale.

G: Virtually no accumulation of starting mixture seen in the path of conveyance.

F: Some starting mixture remaining in the path of conveyance.

P: Blocking of the path of conveyance by the starting mixture.

The results are summarized in Table 1.

Also, 100 g of undried granulated product No. 1 was sampled and the moldability was evaluated on the following scale.

G: Sufficient moldability for all of the granules.

F: Insufficient moldability for some of the granules, but satisfactory as a commercial product.

P: Many granules with insufficient moldability, unsatisfactory as a commercial product.

The results are summarized in Table 1.

Next, the undried granulated product No. 1 was dried for 90 minutes with a rotary kiln kept at 150° C., to obtain granulated product No. 1 having a moisture content of approximately 2 mass %.

Examples 2 to 6

Granulated products No. 2 to No. 6 were produced in the same manner as Example 1, except that the proportions of pulverized crude bentonite and bentonite fine powder, and the downward gradient, were changed as shown in Table 1. The results are summarized in Table 1.

TABLE 1

|  | Pulverized crude bentonite | Bentonite fine powder | First granules | Second granules | Downward gradient | Accumulation on path of conveyance | Moldability |
|---|---|---|---|---|---|---|---|
| Example 1 | 10 parts | 90 parts | 10% | 90% | 100% | G | G |
| Example 2 | 10 parts | 90 parts | 10% | 90% | 500% | G | G |

TABLE 1-continued

|  | Pulverized crude bentonite | Bentonite fine powder | First granules | Second granules | Downward gradient | Accumulation on path of conveyance | Moldability |
|---|---|---|---|---|---|---|---|
| Example 3 | 15 parts | 85 parts | 20% | 80% | 90% | F | G |
| Example 4 | 40 parts | 60 parts | 60% | 40% | 100% | G | G |
| Example 5 | 40 parts | 60 parts | 60% | 40% | 90% | G | G |
| Example 6 | 45 parts | 55 parts | 65% | 35% | 90% | G | F |

Example 7

Granulated products No. 1 to No. 6 were each placed in a container to a depth of about 10 cm, 20 mL of simulated urine (physiological saline at 22° C.) was dropped from a height of 3 cm over a period of 10 seconds, and upon confirming the solid state after 10 minutes, no significant difference was seen between granulated products No. 1 to No. 6.

The invention claimed is:

1. A method of producing animal litter including bentonite, comprising the steps of:
    forming, from a starting material for animal litter containing bentonite, a starting mixture that contains 10 to 60 mass % of granules that remain on an 8.0 mm-aperture sieve and 40 to 90 mass % of granules that pass through an 8.0 mm-aperture sieve;
    conveying the starting mixture on a path of conveyance;
    loading the starting mixture that has been conveyed on a path of conveyance into a granulator capable of pulverizing and granulation, to pulverize at least the granules remaining on the 8.0 mm-aperture sieve while forming a granulated product; and
    drying the granulated product.

2. The method according to claim 1, wherein the average moisture content of the granules remaining on the 8.0 mm-aperture sieve is 15 to 45 mass %.

3. The method according to claim 1, wherein a moisture content of a core section, which occupies 98 mass % of the granules remaining on the 8.0 mm-aperture sieve, is higher than a moisture content of a shell section which occupies 2 mass % thereof.

4. The method according to claim 3, wherein the moisture content of the core section is 20 to 60 mass %, and the moisture content of the shell section is 1 to 20 mass %.

5. The method according to claim 1, wherein the path of conveyance has a region in which a downward gradient is 100 to 500%.

6. The method according to claim 1, wherein the starting material contains pulverized crude bentonite, and the granules remaining on the 8.0 mm-aperture sieve include a pulverized crude bentonite or a portion thereof.

7. The method according to claim 1, wherein the starting material contains bentonite fine powder produced by drying and pulverizing crude bentonite, and the granules remaining on the 8.0mm-aperture sieve and the granules passing through the 8.0 mm-aperture sieve each include the bentonite fine powder.

8. The method according to claim 1, wherein in the step of forming the starting mixture, a starting material for animal litter comprising pulverized crude bentonite, bentonite fine powder produced by drying and pulverizing crude bentonite, and water, is mixed with a mixer to form granules remaining on the 8.0 mm-aperture sieve that comprise the pulverized product, fine powder and water, and to form granules passing through the 8.0 mm-aperture sieve that comprise the fine powder and water.

9. The method according to claim 1, wherein the granulator is an extruding granulator.

10. The method according to claim 2, wherein a moisture content of a core section, which occupies 98 mass % of the granules remaining on the 8.0 mm-aperture sieve, is higher than a moisture content of a shell section which occupies 2 mass % thereof.

11. The method according to claim 10, wherein the moisture content of the core section is 20 to 60 mass %, and the moisture content of the shell section is 1 to 20 mass %.

12. The method according to claim 2, wherein the path of conveyance has a region in which a downward gradient is 100 to 500%.

13. The method according to claim 3, wherein the path of conveyance has a region in which a downward gradient is 100 to 500%.

14. The method according to claim 10, wherein the path of conveyance has a region in which a downward gradient is 100 to 500%.

15. The method according to claim 4, wherein the path of conveyance has a region in which a downward gradient is 100 to 500%.

16. The method according to claim 11, wherein the path of conveyance has a region in which a downward gradient is 100 to 500%.

17. The method according to claim 2, wherein the starting material contains pulverized crude bentonite, and the granules remaining on the 8.0mm-aperture sieve include a pulverized crude bentonite or a portion thereof.

18. The method according to claim 3, wherein the starting material contains pulverized crude bentonite, and the granules remaining on the 8.0mm-aperture sieve include a pulverized crude bentonite or a portion thereof.

19. The method according to claim 10, wherein the starting material contains pulverized crude bentonite, and the granules remaining on the 8.0mm-aperture sieve include a pulverized crude bentonite or a portion thereof.

20. The method according to claim 4, wherein the starting material contains pulverized crude bentonite, and the granules remaining on the 8.0mm-aperture sieve include a pulverized crude bentonite or a portion thereof.

* * * * *